(12) United States Patent
Stewart et al.

(10) Patent No.: US 10,696,204 B2
(45) Date of Patent: Jun. 30, 2020

(54) INERTIAL LATCH

(71) Applicant: GM Global Technology Operations LLC, Detroit, MI (US)

(72) Inventors: Patrick N. Stewart, Macomb, MI (US); Edeena A. Reader, Canton, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 17 days.

(21) Appl. No.: 16/176,479

(22) Filed: Oct. 31, 2018

(65) Prior Publication Data
US 2020/0130550 A1    Apr. 30, 2020

(51) Int. Cl.
| | |
|---|---|
| *B60N 2/40* | (2006.01) |
| *B60N 2/90* | (2018.01) |
| *B60N 2/75* | (2018.01) |
| *E05B 83/32* | (2014.01) |
| *E05B 77/06* | (2014.01) |
| *B60N 2/42* | (2006.01) |
| *B60N 2/433* | (2006.01) |

(52) U.S. Cl.
CPC ............. *B60N 2/938* (2018.02); *B60N 2/753* (2018.02); *B60N 2/43* (2013.01); *B60N 2/433* (2013.01); *B60N 2/757* (2018.02); *B60N 2/76* (2018.02); *B60N 2002/952* (2018.02); *E05B 77/06* (2013.01); *E05B 83/32* (2013.01)

(58) Field of Classification Search
CPC ........ B60N 2/938; B60N 2/753; B60N 2/757; B60N 2/76; B60N 2/433; B60N 2/43

USPC ...................................... 297/216.12, 216.13
See application file for complete search history.

(56) References Cited

U.S. PATENT DOCUMENTS

| | | | | |
|---|---|---|---|---|
| 4,846,526 | A * | 7/1989 | Allen | B60N 2/20 297/378.11 |
| 5,393,116 | A * | 2/1995 | Bolsworth | B60N 2/01583 296/65.03 |
| 5,658,043 | A * | 8/1997 | Davidson | B60N 2/43 297/113 |
| 6,585,324 | B2 * | 7/2003 | Eppert | B60N 2/433 297/216.13 |
| 9,616,787 | B2 * | 4/2017 | Siqueira | B60N 2/757 |
| 9,969,308 | B2 * | 5/2018 | Ban | B60N 2/01583 |

* cited by examiner

*Primary Examiner* — Syed A Islam (57) ABSTRACT

An inertial latch for a motor vehicle armrest is rotatably connected to a a bracket mounted to a support structure; an armrest interfacing component is disposed in an arcuate slot in the bracket, the slot extending from a first to a second end; a primary pawl rotatable from a first to a second position and limiting motion of the interfacing component in the slot; a secondary pawl rotatable from a third position to a fourth position and limiting motion of the primary pawl; a stop limits motion of the secondary pawl. The armrest articulates from a closed to an open position, the interfacing component moves through the entire slot when the primary pawl is in the first position, the interfacing component is held within a portion less than the entire slot when the primary pawl is in the second position, and the interfacing component is releasable from the portion.

20 Claims, 4 Drawing Sheets

FIG. 5

INERTIAL LATCH

INTRODUCTION

The present disclosure relates to latches, and more specifically to inertial latches used in automotive applications such as armrests. In typical armrests, and specifically in typical rear seat armrests, an inertial latch often forms a portion of the hinge mechanism for the armrest. The inertial latch prevents the armrest from actuating from a closed to an open position, or from an up to a down position under certain high acceleration situations. That is the inertial latch prevents the armrest from unintentionally moving from the up or closed position to a down or open position when sudden deceleration occurs, such as during an aggressive deceleration or stop, or during a collision. However, typical inertial latches may unintentionally engaged during non-dynamic events, or they may unsuccessfully or partially latch or bounce back and unintentionally disengage as a result. Accordingly, there is a need in the art for a new and improved inertial latch for automotive armrests that reduces the potential for unintentional engagement or disengagement of the inertial latch, while reducing or maintaining packaging space requirements and costs, and which may be retrofitted to current automotive applications.

SUMMARY

According to several aspects of the present disclosure, an inertial latch for a movable component of a motor vehicle includes a bracket mounted to a support structure of the motor vehicle, the movable component rotatably connected to the bracket by a first pin; an interfacing component of a movable component disposed in an arcuate slot formed in the bracket, the arcuate slot extending from a first end to a second end. The inertial latch further includes a primary pawl rotatable about a second pin from a first position to a second position, the primary pawl selectively limiting motion of the interfacing component in the arcuate slot, a secondary pawl rotatable about a third pin from a third position to a fourth position, the secondary pawl selectively limiting motion of the primary pawl; and a stop limiting a range of motion of the secondary pawl. The movable component articulates from a closed position to an open position, the interfacing component is allowed to move through the entirety of the arcuate slot when the primary pawl is in a first position, the interfacing component is held within a first portion less than the entirety of the arcuate slot when the primary pawl is in a second position, and the interfacing component is selectively releasable from the first portion.

In another aspect of the present disclosure the primary pawl is substantially L-shaped and biased towards the first position by a first control spring.

In another aspect of the present disclosure the secondary pawl is substantially chevron shaped and biased towards the third position by a second control spring.

In another aspect of the present disclosure when the movable component is in the closed position and not subjected to dynamic external forces, the interfacing component is disposed at the first end of the arcuate slot, and the primary pawl is in the first position.

In another aspect of the present disclosure when the interfacing component is disposed at the first end of the arcuate slot, the interfacing component interacts with an interference portion of the secondary pawl and the secondary pawl is moved away from the stop.

In another aspect of the present disclosure when the movable component is in the open position and not subjected to dynamic external forces, the interfacing component is disposed at the second end of the arcuate slot opposite from the first end, the primary pawl is in the first position, and the secondary pawl is in the third position, the secondary pawl is in contact with the stop in the third position.

In another aspect of the present disclosure when the movable component is in the closed position and subjected to dynamic external forces, the movable component engages a locked position in which the primary pawl moves from the first position to the second position, the interfacing component moves away from the first end of the arcuate slot, and the secondary pawl moves from the third position to the fourth position, the interfacing component contacts with and interferes with movement of the primary pawl, the secondary pawl contacts and interferes with movement of the primary pawl and the interfacing component, and the interfacing component is held within the first portion.

In another aspect of the present disclosure the locked position of the movable component is selectively releasable by manipulating the movable component from the locked position to the closed position.

In another aspect of the present disclosure the interfacing component is formed with a slot, the slot optimally sized and shaped to accept the primary pawl when the primary pawl is in the second position.

In another aspect of the present disclosure an inertial latch for an armrest of a motor vehicle includes a bracket mounted to a support structure of the motor vehicle, the bracket having a plurality of fasteners, the armrest rotatably connected to the bracket by a first fastener; a travel rod disposed in an arcuate slot formed in the bracket, the arcuate slot extending from a first end to a second end, an insert disposed in at least a portion of the arcuate slot, the insert altering an effective width of the arcuate slot. The inertial latch further includes a primary pawl rotatable about a second fastener from a first position to a second position, the primary pawl biased towards the first position and selectively limiting motion of the travel rod in the arcuate slot; a secondary pawl rotatable about a third pin from a third position to a fourth position, the secondary pawl biased towards the third position and selectively limiting motion of the primary pawl; and a stop limiting a range of motion of the secondary pawl. The armrest articulates from a closed position to an open position, the travel rod is allowed to move through the entirety of the arcuate slot when the primary pawl is in a first position, the travel rod is held within a first portion less than the entirety of the arcuate slot when the primary pawl is in a second position, and the travel rod is selectively releasable from the first portion.

In another aspect of the present disclosure the primary pawl is biased towards the first position by a first control spring, and the secondary pawl is biased towards the third position by a second control spring.

In another aspect of the present disclosure the first control spring is a helical spring and the second control spring is a torsion spring.

In another aspect of the present disclosure the primary pawl has a substantially L-shaped profile and the secondary pawl has a substantially chevron-shaped profile.

In another aspect of the present disclosure the secondary pawl is in contact with the stop when the secondary pawl is in the third position.

In another aspect of the present disclosure when the armrest is in the closed position and not subjected to dynamic external forces, the travel rod is disposed at the first end of the arcuate slot, and the primary pawl is in the first position.

In another aspect of the present disclosure when the travel rod is disposed at the first end of the arcuate slot, the travel rod interacts with an interference portion of the secondary pawl and the secondary pawl is moved away from the stop.

In another aspect of the present disclosure when the armrest is in the open position and not subjected to dynamic external forces, the travel rod is disposed at the second end of the arcuate slot opposite from the first end, the primary pawl is in the first position, and the secondary pawl is in the third position, and the secondary pawl is in contact with the stop in the third position.

In another aspect of the present disclosure when the armrest is in the closed position and subjected to dynamic external forces, the armrest engages a locked position in which the primary pawl moves from the first position to the second position, the travel rod moves away from the first end of the arcuate slot, and the secondary pawl moves from the third position to the fourth position, the travel rod contacts and interferes with movement of the primary pawl, the secondary pawl contacts and interferes with movement of the primary pawl and the travel rod, and the travel rod is held within the first portion.

In another aspect of the present disclosure the locked position of the armrest is selectively releasable by manipulating the armrest from the locked position to the closed position.

In another aspect of the present disclosure an inertial latch for an armrest of a motor vehicle includes a bracket mounted to a support structure of the motor vehicle, the bracket having a plurality of fasteners, the armrest rotatably connected to the bracket by a first fastener; a travel rod disposed in an arcuate slot formed in the bracket, the arcuate slot extending from a first end to a second end, the travel rod including a slot; an insert disposed in at least a portion of the arcuate slot, the insert altering an effective width of the arcuate slot. The inertial latch further includes a primary pawl rotatable about a second fastener from a first position to a second position, the primary pawl biased towards the first position by a first control spring, the primary pawl selectively limiting motion of the travel rod in the arcuate slot; a secondary pawl rotatable about a third pin from a third position to a fourth position, the secondary pawl biased towards the third position by a second control spring, the secondary pawl selectively limiting motion of the primary pawl, the secondary pawl having an interference portion that physically contacts the travel rod when the travel rod is at the first end of the arcuate slot; and a stop limiting a range of motion of the secondary pawl. The armrest articulates from a closed position to an open position, the travel rod is allowed to move through the entirety of the arcuate slot when the primary pawl is in a first position; the primary pawl engages with the slot of the travel rod when the primary pawl is in the second position, and the travel rod is held within a first portion less than the entirety of the arcuate slot when the primary pawl is in a second position; the travel rod is selectively releasable from the first portion by manipulating the armrest from the locked position at least part way towards the closed position, the secondary pawl is in contact with the stop when the secondary pawl is in the third position, and when the armrest is in the closed position and not subjected to dynamic external forces, the travel rod is disposed at the first end of the arcuate slot, and the primary pawl is in the first position, and when the armrest is in the open position and not subjected to dynamic external forces, the travel rod is disposed at the second end of the arcuate slot opposite from the first end, the primary pawl is in the first position, and the secondary pawl is in the third position, and the secondary pawl is in contact with the stop in the third position, and when the armrest is in the closed position and subjected to dynamic external forces, the armrest engages a locked position in which the primary pawl moves from the first position to the second position, the travel rod moves away from the first end of the arcuate slot, and the secondary pawl moves from the third position to the fourth position, the travel rod contacts and interferes with movement of the primary pawl, the secondary pawl contacts and interferes with movement of the primary pawl and the travel rod, and the travel rod is held within the first portion.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity, directional terms such as top, bottom, left, right, up, over, above, below, beneath, rear, and front, may be used with respect to the drawings. Likewise, the terms "forward", "rear", "inner", "inwardly", "outer", "outwardly", "above", and "below" are terms used relative to the orientation of the motor vehicle as shown in the drawings of the present application. Thus, "forward" refers to a direction toward a front of a motor vehicle, "rearward" refers to a direction toward a rear of a motor vehicle, "passenger" refers to a direction towards a passenger side of the motor vehicle (right-hand side in the context of this particular application), "driver" or "driver side" refers to a direction towards the driver's side of the motor vehicle (left-hand side in the context of this particular application), "inner" and "inwardly" refers to a direction towards the interior of a motor vehicle, and "outer" and "outwardly" refers to a direction towards the exterior of a motor vehicle, "below" refers to a direction towards the bottom of the motor vehicle, and "above" refers to a direction towards a top of the motor vehicle. These and similar directional terms are not to be construed to limit the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is related to particular example embodiments only and is not intended to be limiting. As used herein, the singular forms "a," "an," and "the" may be intended to include the plural forms as well, unless the context clearly indicates otherwise. The terms "comprises", "includes," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "disposed on," "connected to," or "coupled to" another element or layer, it may be directly on, engaged, disposed, connected or coupled to the other element or layer, or intervening elements or layers may be present. In contrast, when an element is referred to as being "directly on," "directly engaged to," "directly disposed on," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all storage compartmentations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The following description is merely exemplary in nature and is not intended to limit the present disclosure, application, or uses.

Figure 1:
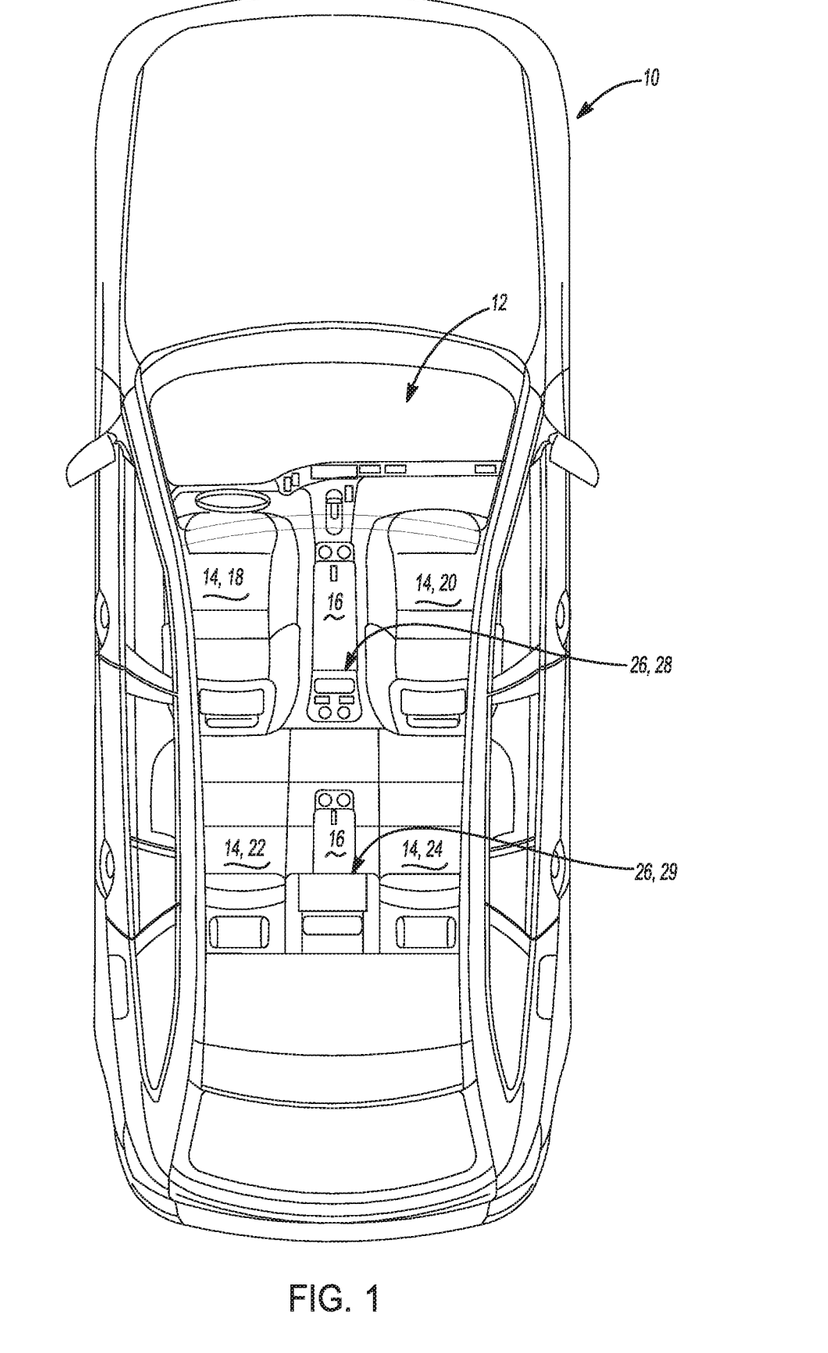
FIG. 1 is an environmental view of a motor vehicle having an inertial latch disposed in an armrest mechanism according to an aspect of the present disclosure.

Referring now to FIG. 1 a motor vehicle is shown and generally indicated by reference number 10. While the motor vehicle is illustrated as a car, it should be appreciated that the motor vehicle 10 may be any type of vehicle including a car, a van, a truck, a motor home, an aircraft, a spacecraft, a water craft, or any other such vehicle without departing from the scope or intent of the present disclosure. The motor vehicle 10 includes a passenger compartment 12 having a plurality of seats 14. An armrest 16 is disposed between a driver seat 18 and a passenger seat 20. An armrest 16 is also disposed between a left rear seat 22 and a right rear seat 24. Additional armrests 16 may be disposed elsewhere within the passenger compartment 12 without departing from the scope or intent of the present disclosure. For example, armrests may be disposed between pilot and copilot and/or passenger seats on an aircraft (not shown), between passenger seats on a watercraft (not shown), between passenger seats on a bus (not shown), or the like. The armrest 16 between the driver and passenger seats 18, 20 is rotatably attached to a structural component 26 of a center console 28, and the armrest 16 between the left and right rear seats 22, 24 is rotatably attached to a structural component 26 of a rear seatback assembly 29.

Turning now to FIGS. 2-4B, and with continuing reference to FIG. 1, operational positions of the armrests 16 under several circumstances are shown. As described above, both front and rear armrests 16 shown in FIG. 1 are rotatably attached to structural components 26 of the motor vehicle 10 passenger compartment 12. More specifically, the armrests 16 are rotatably attached to a bracket 30 by a pin 32 disposed in a pin receiver 34. The bracket 30 is formed of a metal, metal alloy, plastic, or the like. The bracket 30 is affixed to a structural component of the motor vehicle 10 such as a seatback support (not specifically shown), or other structural member (not shown). In some aspects, the bracket 30 is affixed to the structural component of the motor vehicle by mechanical, thermal, or chemical means such as: bolts, nuts, studs, rivets, screws, welds, braising, adhesives, or combinations of the above or the like. In some examples, the bracket 30 is formed of aluminum or steel, and consists of a single unitary pressing, molded component, or the like. The bracket 30 is structural, and therefore is optimized to support the armrest 16, and forces applied to the armrest 16 by passengers and/or objects within the motor vehicle 10 passenger compartment 12. In several aspects, the pin 32 is a dowel-like protrusion extending from the armrest 16 into the pin receiver 34. The pin 32 supports the armrest 16 and is optimized to support weight applied by passengers resting limbs and/or objects on the armrest 16. Accordingly, the pin 32 is composed of a structurally sound material such as metal, plastic, or the like. The pin 32 is assembled into a pin receiver 34 formed in the bracket 30. In several aspects, the pin 32 includes an expanded head portion 36, and a shaft portion (not specifically shown). The expanded head portion 36 has a diameter larger than the diameter of the shaft portion. The expanded head portion 36 is optimized to fit into an expanded portion 38 of the pin receiver 34 in an insertion position (not specifically shown), and then to be maneuvered into a reduced portion 39 of the pin receiver 34 optimized to accept and hold the shaft portion of the pin 32 in an operational position. Accordingly, the expanded head portion 36 locks the pin 32 into the pin receiver 34, while the shaft portion allows the pin 32 to rotate within the pin receiver 34.

The armrest 16 also includes an interfacing component or travel rod 40. The travel rod 40 is a dowel-like component disposed in an arcuate slot 42 formed in the bracket 30. In several aspects, like the pin 32 described above, the travel rod 40 is a structural component that supports the armrest 16 and supports or resists forces applied to the armrest 16 by passengers and/or objects within the motor vehicle 10 passenger compartment 12. Accordingly, the travel rod 40 is formed of a structurally sound material such as metal, plastic, or the like. The travel rod 40 is offset from the pin 32 of the armrest 16. When the travel rod 40 is assembled with the arcuate slot 42 and the pin 32 is assembled with the pin receiver 34, the travel rod 40 limits rotational travel of the armrest 16. In some examples, the travel rod 40 is equipped with a cap 44. The cap 44 assists in locating and positioning the travel rod 40 within the arcuate slot 42. Because the cap 44 of some examples is made of a nylon or similar material, the cap 44 also improves the smoothness of movement of the travel rod 40 through the arcuate slot 42 while decreasing noise, vibration, and harshness (NVH) characteristics of the travel rod 40 within the arcuate slot 42.

The arcuate slot 42 extends from a first portion 46 to a second portion 48. In several aspects, the first portion 46 is substantially below and forward of the second portion 48. In several aspects, the arcuate slot 42 allows the armrest 16 to rotate through a first range of motion of approximately 90° from an up position to a down position, or vice versa. However, it should be appreciated that while the first range of motion is described as being approximately 90°, that depending on the particular motor vehicle 10 design, the first range of motion may be substantially greater than 90°, or less than 90°. For example, in a motor vehicle 10 equipped with so-called "captain's chairs", the armrests 16 may be designed to rotate through significantly more than 270° or more. In several aspects, the arcuate slot 42 is also equipped with an insert 50. The insert 50 may be formed of any of a variety of different materials, including metal, plastic, nylon, or the like without departing from the scope or intent of the present disclosure. The insert 50 effectively narrows a width "W" of at least a portion of the arcuate slot 42 and provides tactile resistance to motion of the travel rod 40 through the arcuate slot 42.

The bracket 30 supports an inertial latch 52. The inertial latch 52 includes a primary pawl 54, a secondary pawl 56, a first control spring 58, a second control spring 60 and one or more stops 62. With particular reference to the primary pawl 54, the primary pawl 54 is made of aluminum, steel, or plastic material, and consists of a single component with various design features for interfacing with the other latch assembly 52 components. At a first end 64 of the primary pawl 54, a first hole 66 is present to allow for a fastener 68, such as a bolt or rivet, to pass through and rotatably secure the primary pawl 54 to the bracket 30. Proximate the fastener 68 attachment location, a second hole 70 or similar feature is used for securing a first end 72 of the first control spring 58, while the second end 74 of the first control spring 58 is secured to the bracket 30. The first control spring 58 is designed to control and limit the operation of the primary pawl 54. It should be appreciated that first control spring 58 may vary in type, strength, resilience, and the like depending on the packaging restrictions and performance requirements of the inertial latch 52. That is, the first control spring 58 may be a helical spring, a torsion spring, or other like biasing members without departing from the scope or intent of the present disclosure. The overall shape of the primary pawl 54 is optimized so that the component mass is biased toward a second end 76 of the primary pawl 54 opposite of the first hole 66 and fastener 68 location. In several aspects, the primary pawl 54 has a substantially "L"-shaped profile with the fastener 68 disposed at substantially at one end of the "L". However, it should be appreciated that depending on packaging and design constraints, the exact shape, size, weight, and orientation of the primary pawl 54 may vary substantially without departing from the scope or intent of the present disclosure.

The secondary pawl 56, like the primary pawl 54, is made aluminum, steel, or plastic material, consists of a single component with various design features for interfacing with the other latch assembly 52 components. In several aspects, the secondary pawl 56 has an overall shape approximating a chevron. That is, the secondary pawl 56 has a somewhat obtuse substantially angular "V" or "L" shape. However, it should be appreciated that depending on packaging and design constraints, the exact shape of the secondary pawl 56 may vary substantially from the obtuse substantially angular "V" or "L" or chevron shape. More generally, the overall shape of the secondary pawl 56 is designed in such a way that the secondary pawl 56 partially interferes with the interfacing component or travel rod 40 of the armrest 16 under specific situations which will be described hereinbelow. At a first end 78 of the secondary pawl 56, a third hole 80 is present to allow for a fastener 68, such as a bolt or rivet, to pass through and secure the secondary pawl 56 to the bracket 30. Proximate the fastener 68 attachment location, a fourth hole 82 or similar feature is used for securing a first end 84 of the second control spring 60, while a second end 86 of the second control spring 60 is secured to the bracket 30. The second control spring 60 is designed to control and limit the operation of the secondary pawl 56. As is the case with the first control spring 58, the second control spring 60 type can vary depending on the packaging restrictions and performance requirements of the inertial latch 52. Accordingly, the second control spring 60 may be a helical spring, a torsion spring, or other like biasing members without departing from the scope or intent of the present disclosure. The second control spring 60 biases the secondary pawl 56 towards the stop 62. The stop 62 limits a range of motion of the secondary pawl 56 so that the secondary pawl 56 does not unintentionally interfere with movement of the travel rod 40 or the primary pawl 54. The stop 62 may be formed of a variety of different materials, such as metal, plastic, rubber, or the like. The stop 62 of some examples is formed as a portion of the bracket 30, while in other examples, the stop 62 is molded onto the bracket 30 or physically or chemically attached to the bracket 30 during manufacturing or assembly. Additional stops 62 may be likewise be included with the bracket 30 to limit movement of other inertial latch 52 components, and/or to reduce operational noise and vibration of the inertial latch 52 and the armrest 16, as well as to prevent interference between movable components of the inertial latch 52 mechanism.

In several aspects, an edge 88 of some examples of the primary pawl 54, most opposite of the fastener 68 attachment location has a "saw-tooth" or ridged pattern that may be used to improve the component interface with the secondary pawl 56 during dynamic events external to the armrest 16. Likewise, an edge 90 of some examples of the secondary pawl 56, most opposite of the fastener 68 attachment location has a "saw-tooth" or ridged pattern may be used to improve the component interface with the primary pawl 54 during dynamic events external to the armrest 16.

Figure 2:
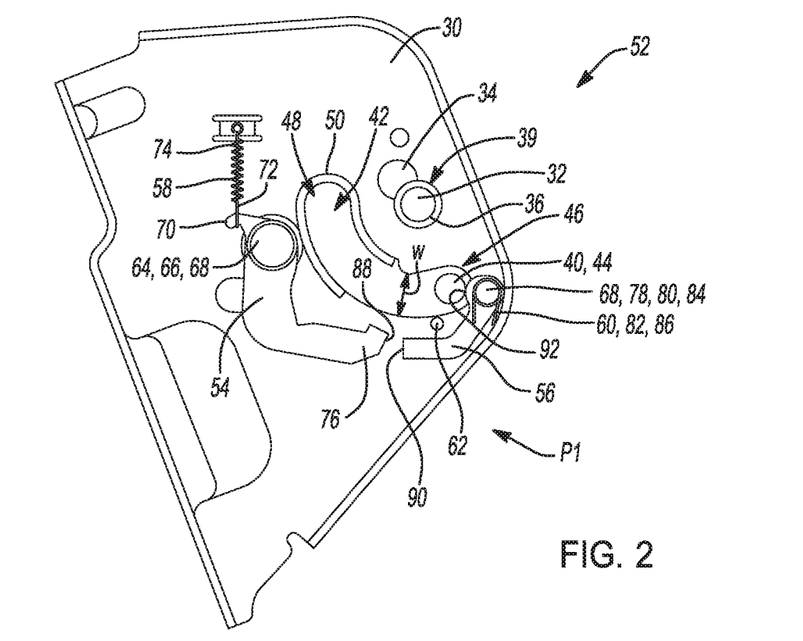
FIG. 2 is a side view of a portion of an inertial latch for use with an armrest and shown in a rest or home position according to an aspect of the present disclosure.

With particular reference to FIG. 2, the armrest 16 is shown in a first normal operational condition in which the armrest 16 is in a first or "up" position "P1". In the first position "P1", the armrest 16 is in a situation in which no substantial dynamic external forces are being applied. That is, the armrest 16 in FIG. 2 is not currently being subjected to sudden or dynamic accelerative, or decelerative conditions. In the first position "P1", the travel rod 40 is disposed at the first portion 46 of the arcuate slot 42. In several aspects, the first portion 46 of the arcuate slot 42 is substantially below an forward of the second portion 48 of the arcuate slot 42. When the armrest is in the first position "P1", in a rear-seat armrest 16, the armrest 16 forms a portion of the rear seatback assembly 29, and can be used as a back-rest or seatback for a center rear seat. Similarly, in motor vehicles 10 equipped with front bench seats, when the armrest 16 is in the up or closed position, the armrest 16 forms a back-rest for a front middle seat (not specifically shown). Likewise, in aeronautical, naval, or other such applications, when the armrest 16 is in the up or closed position, the armrest 16 forms at least a portion of a back-rest or seatback. When the armrest 16 is in the first position "P1", the travel rod 40 engages with or interferes with movement of an interference portion 92 of the secondary pawl 56, thereby causing the secondary pawl 56 to be moved away from the stop 62. Accordingly, when the armrest 16 is in the first position "P1", and the travel rod 40 is engaged with the interference portion 92, the interference portion 92 provides tactile resistance to the movement of the armrest 16 thereby allowing the armrest 16 to maintain the up or closed position without inadvertently rotating to the down or open position.

Figure 3:
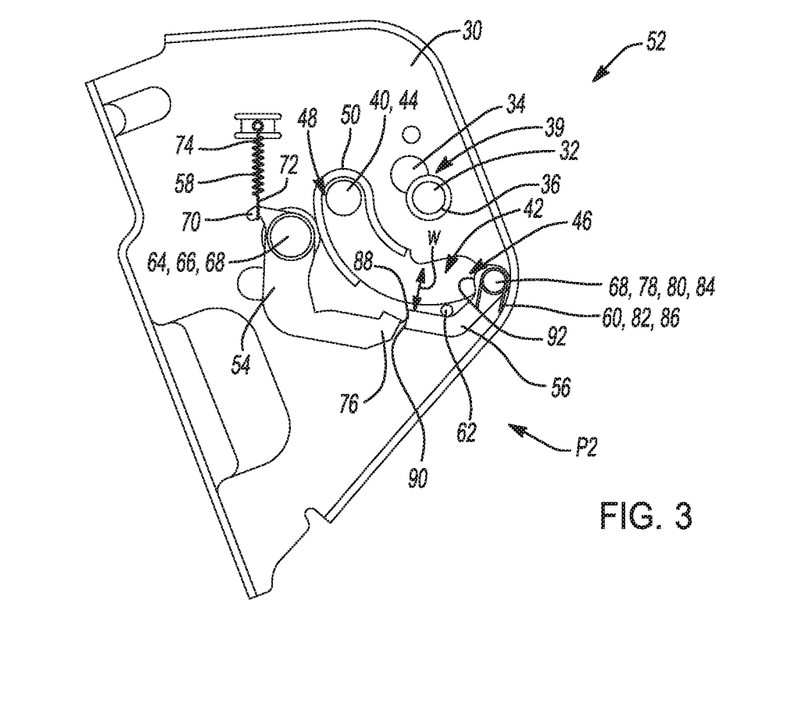
FIG. 3 is a side view of a portion of an inertial latch for use with an armrest and shown in a normal mode of operation according to an aspect of the present disclosure.

In FIG. 3, the armrest 16 is shown in a second normal mode of operation in which the armrest 16 is in a second or "down" position "P2". In the second position "P2" the travel rod 40 is disposed at the second portion 48 of the arcuate slot 42 and the armrest 16 is in the open or down position. In the open or down position, the armrest 16 may be used as a support surface for limbs or objects. That is, in the open position the armrest 16 functions as a rest for arms. In the second position "P2", the primary pawl 54 remains in exactly the same position as when the armrest 16 is in the first position "P1" under normal operating conditions. However, because the second control spring 60 biases the secondary pawl 56 towards the stop 62, once the travel rod 40 moves away from the interference portion 92, the secondary pawl 56 moves towards and engages with the stop 62.

More generally, in each of the examples of FIGS. 2 and 3, under normal operating conditions, the primary pawl 54 will not move or engage with any of the other inertial latch 52 components because the first control spring 58 biases the primary pawl 54 away from the arcuate slot 42 and thereby away from the other inertial latch 52 components. Likewise, the weight distribution of the primary pawl 54 generally biases the primary pawl 54 away from the arcuate slot 42 under normal operating conditions.

Figure 4A:
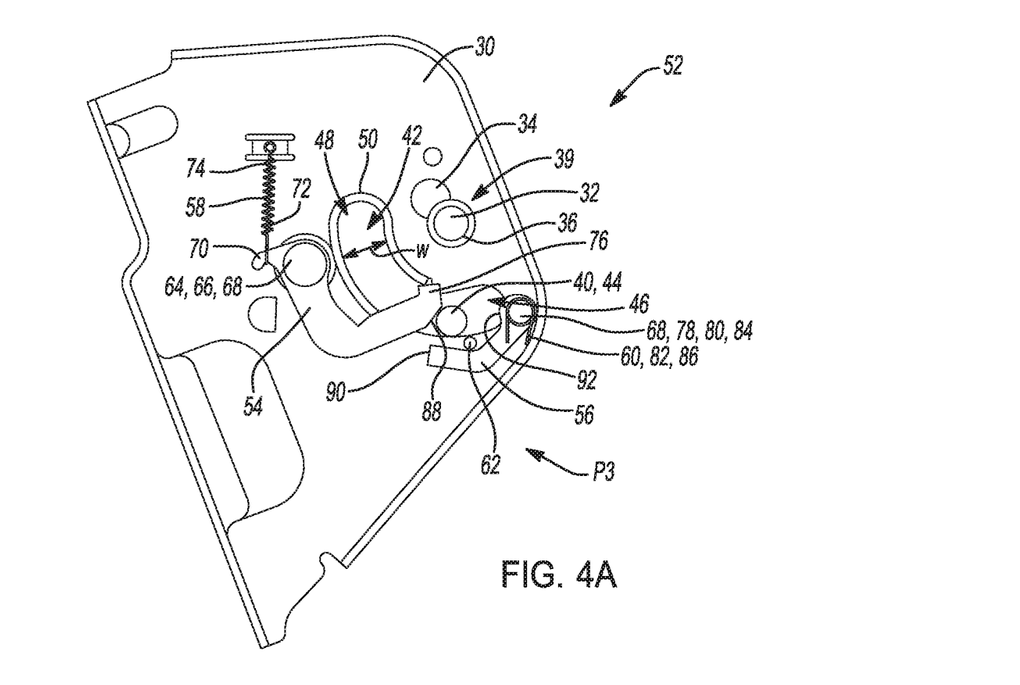
FIG. 4A is a side view of a portion of an inertial latch for use with an armrest and shown in a position resulting from response to an external dynamic event according to an aspect of the present disclosure.
Figure 4B:
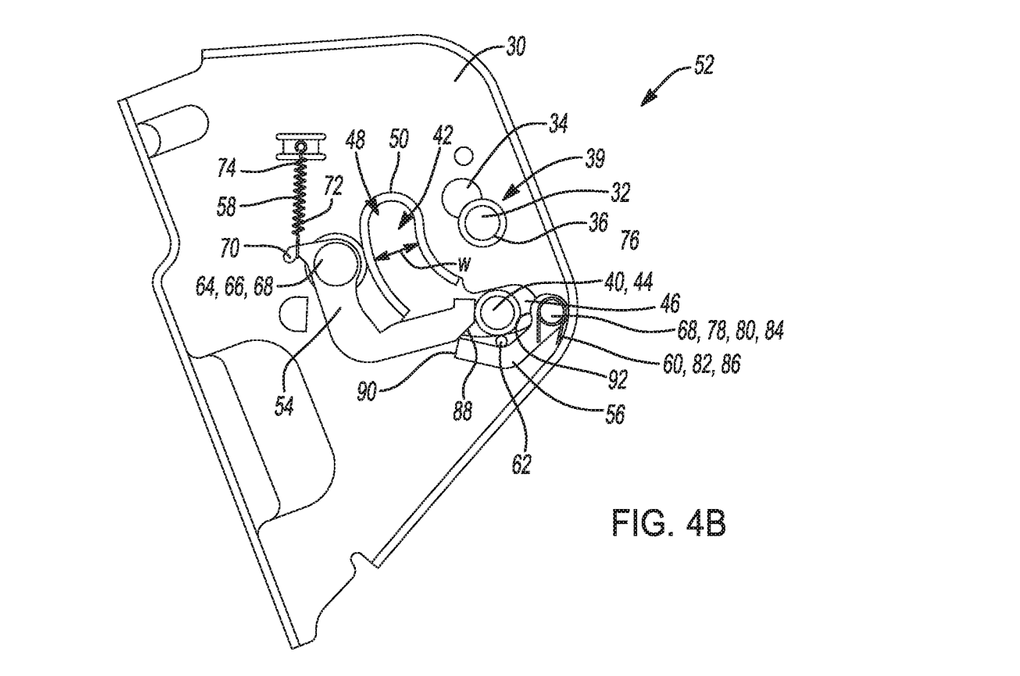
FIG. 4B is a side view of a portion of an inertial latch for use with an armrest and shown in a second position resulting from response to an external dynamic event according to an aspect of the present disclosure.

However, under the influence of dynamic external events, the inertial latch 52 behaves somewhat differently as is shown in FIGS. 4A and 4B. During dynamic event external to the inertial latch 52, the operation of the inertial latch 52 is designed to perform as follows. In response to some dynamic events, the primary pawl 54 moves towards and interferes with the motion of the travel rod 40 due to the effects of inertia on the biased shaped mass of the primary pawl 54. Because the travel rod 40 has moved away from the interference portion 92 of the secondary pawl 56, the second control spring 60 moves the secondary pawl 56 towards the arcuate slot 42 until the secondary pawl 56 contacts the stop 62. Because the primary pawl 54 has moved into the path of the travel rod 40, movement of the travel rod 40 within the arcuate slot 42 is arrested, and therefore, movement of the armrest 16 is halted.

In the example of FIG. 4B, in response to dynamic events, first, the primary pawl 54 moves towards and interferes with the motion of travel rod 40 due to the effect of inertia on the biased shaped mass of the primary pawl 54. Second, the secondary pawl 56 moves with respect to the motion of the travel rod 40 due to assistance from the second control spring 60. As the travel rod 40 of inertial latch 52 interferes with the primary pawl 54, the secondary pawl 56 engages with and interlocks with the primary pawl 54, thereby locking the travel rod 40 in place such that the armrest 16 is locked into a third position "P3". To subsequently disengage the inertial latch 52, and thereby the armrest 16, from the locked, halted, or third position "P3" shown in FIGS. 4A and 4B, the inertial latch 52 must first be returned to its original orientation or set position. That is, the inertial latch 52 must be reset by manipulating the armrest 16 back into the first or up position "P1". Returning the inertial latch 52 to the original orientation or set position will cause the travel rod 40 to contact the interference portion 92 of the secondary pawl 56, thereby disengaging the secondary pawl 56 from the primary pawl 54 and moving the secondary pawl 56 away from the arcuate slot 42. When the secondary pawl 56 is disengaged from the primary pawl 54, the both the primary and secondary pawls 54, 56 may freely return to their respective static origin positions.

Figure 5:
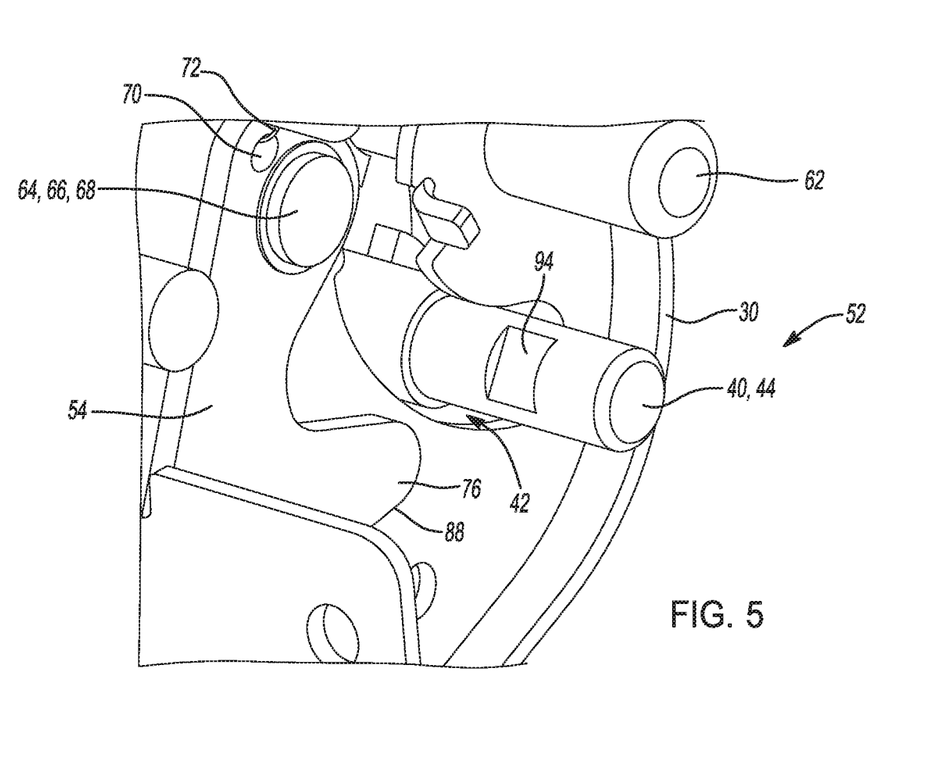
FIG. 5 is a perspective side view of a portion of an inertial latch depicting a detail of an interfacing component or travel rod according to an aspect of the present disclosure.

In some examples, and as is shown in FIG. 5, the third or locked position "P3" is enhanced by the provision of a slot 94 formed in the travel rod 40. The slot 94 of the travel rod 40 is sized and shaped to accept the second end 76 of the primary pawl 54. The slot 94 in the travel rod 40 engages or interlocks with the second end 76 of the primary pawl 54, thereby preventing movement of the travel rod 40 towards the second portion 48 of the arcuate slot 42 under dynamic external force applications.

An inertial latch 52 of the present disclosure offers several advantages. These include reducing the potential for unintentional engagement or disengagement of the inertial latch 52 of an armrest 16, while reducing or maintaining packaging space requirements, reducing or maintaining production complexity and costs, and which may be retrofitted to current motor vehicle 10 applications.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An inertial latch for a movable component of a motor vehicle comprising:
   a bracket mounted to a support structure of the motor vehicle, the movable component rotatably connected to the bracket by a first pin;
   an interfacing component of the movable component disposed in an arcuate slot formed in the bracket, the arcuate slot extending from a first end to a second end;
   a primary pawl rotatable about a second pin from a first position to a second position, the primary pawl selectively limiting motion of the interfacing component in the arcuate slot;
   a secondary pawl rotatable about a third pin from a third position to a fourth position, the secondary pawl selectively limiting motion of the primary pawl; and
   a stop limiting a range of motion of the secondary pawl, wherein the movable component articulates from a closed position to an open position, the interfacing component is allowed to move through the entirety of the arcuate slot when the primary pawl is in the first position, the interfacing component is held within a first portion less than the entirety of the arcuate slot when the primary pawl is in the second position, and the interfacing component is selectively releasable from the first portion.

2. The inertial latch of claim 1 wherein the primary pawl is substantially L-shaped and biased towards the first position by a first control spring.

3. The inertial latch of claim 1 wherein the secondary pawl is substantially chevron shaped and biased towards the third position by a second control spring.

4. The inertial latch of claim 1 wherein when the movable component is in the closed position and not subjected to dynamic external forces, the interfacing component is disposed at the first end of the arcuate slot, and the primary pawl is in the first position.

5. The inertial latch of claim 4 wherein when the interfacing component is disposed at the first end of the arcuate slot, the interfacing component interacts with an interference portion of the secondary pawl and the secondary pawl is moved away from the stop.

6. The inertial latch of claim 1 wherein when the movable component is in the open position and not subjected to dynamic external forces, the interfacing component is disposed at the second end of the arcuate slot opposite from the first end, the primary pawl is in the first position, and the secondary pawl is in the third position, wherein the secondary pawl is in contact with the stop in the third position.

7. The inertial latch of claim 1 wherein when the movable component is in the closed position and subjected to dynamic external forces, the movable component engages a locked position in which the primary pawl moves from the first position to the second position, the interfacing component moves away from the first end of the arcuate slot, and the secondary pawl moves from the third position to the fourth position, wherein the interfacing component contacts with and interferes with movement of the primary pawl, the secondary pawl contacts and interferes with movement of the primary pawl and the interfacing component, and the interfacing component is held within the first portion.

8. The inertial latch of claim 7, wherein the locked position of the movable component is selectively releasable by manipulating the movable component from the locked position to the closed position.

9. The inertial latch of claim 1, wherein the interfacing component is formed with a slot, the slot optimally sized and shaped to accept the primary pawl when the primary pawl is in the second position.

10. An inertial latch for an armrest of a motor vehicle comprising:
    a bracket mounted to a support structure of the motor vehicle, the bracket having a plurality of fasteners, the armrest rotatably connected to the bracket by a first fastener;
    a travel rod disposed in an arcuate slot formed in the bracket, the arcuate slot extending from a first end to a second end, an insert disposed in at least a portion of the arcuate slot, the insert altering an effective width of the arcuate slot;
    a primary pawl rotatable about a second fastener from a first position to a second position, the primary pawl biased towards the first position and selectively limiting motion of the travel rod in the arcuate slot;
    a secondary pawl rotatable about a third pin from a third position to a fourth position, the secondary pawl biased towards the third position and selectively limiting motion of the primary pawl; and
    a stop limiting a range of motion of the secondary pawl, wherein the armrest articulates from a closed position to an open position, the travel rod is allowed to move through the entirety of the arcuate slot when the primary pawl is in a first position, the travel rod is held within a first portion less than the entirety of the arcuate slot when the primary pawl is in a second position, and the travel rod is selectively releasable from the first portion.

11. The inertial latch for an armrest of a motor vehicle of claim 10 wherein the primary pawl is biased towards the first position by a first control spring, and the secondary pawl is biased towards the third position by a second control spring.

12. The inertial latch for an armrest of a motor vehicle of claim 11 wherein the first control spring is a helical spring and the second control spring is a torsion spring.

13. The inertial latch for an armrest of a motor vehicle of claim 10 wherein the primary pawl has a substantially L-shaped profile and the secondary pawl has a substantially chevron-shaped profile.

14. The inertial latch for an armrest of a motor vehicle of claim 10 wherein the secondary pawl is in contact with the stop when the secondary pawl is in the third position.

15. The inertial latch for an armrest of a motor vehicle of claim 10 wherein when the armrest is in the closed position and not subjected to dynamic external forces, the travel rod is disposed at the first end of the arcuate slot, and the primary pawl is in the first position.

16. The inertial latch of claim 10 wherein when the travel rod is disposed at the first end of the arcuate slot, the travel rod interacts with an interference portion of the secondary pawl and the secondary pawl is moved away from the stop.

17. The inertial latch of claim 10 wherein when the armrest is in the open position and not subjected to dynamic external forces, the travel rod is disposed at the second end of the arcuate slot opposite from the first end, the primary pawl is in the first position, and the secondary pawl is in the third position, and the secondary pawl is in contact with the stop in the third position.

18. The inertial latch of claim 10 wherein when the armrest is in the closed position and subjected to dynamic external forces, the armrest engages a locked position in which the primary pawl moves from the first position to the second position, the travel rod moves away from the first end of the arcuate slot, and the secondary pawl moves from the third position to the fourth position, wherein the travel rod contacts and interferes with movement of the primary pawl, the secondary pawl contacts and interferes with movement of the primary pawl and the travel rod, and the travel rod is held within the first portion.

19. The inertial latch of claim 18, wherein the locked position of the armrest is selectively releasable by manipulating the armrest from the locked position to the closed position.

20. An inertial latch for an armrest of a motor vehicle comprising:
- a bracket mounted to a support structure of the motor vehicle, the bracket having a plurality of fasteners, the armrest rotatably connected to the bracket by a first fastener;
- a travel rod disposed in an arcuate slot formed in the bracket, the arcuate slot extending from a first end to a second end, the travel rod including a slot;
- an insert disposed in at least a portion of the arcuate slot, the insert altering an effective width of the arcuate slot;
- a primary pawl rotatable about a second fastener from a first position to a second position, the primary pawl biased towards the first position by a first control spring, the primary pawl selectively limiting motion of the travel rod in the arcuate slot;
- a secondary pawl rotatable about a third pin from a third position to a fourth position, the secondary pawl biased towards the third position by a second control spring, the secondary pawl selectively limiting motion of the primary pawl, the secondary pawl having an interference portion that physically contacts the travel rod when the travel rod is at the first end of the arcuate slot; and
- a stop limiting a range of motion of the secondary pawl, wherein the armrest articulates from a closed position to an open position, the travel rod is allowed to move through the entirety of the arcuate slot when the primary pawl is in a first position; the primary pawl engages with the slot of the travel rod when the primary pawl is in the second position, and the travel rod is held within a first portion less than the entirety of the arcuate slot when the primary pawl is in a second position; the travel rod is selectively releasable from the first portion by manipulating the armrest from the locked position at least part way towards the closed position, the secondary pawl is in contact with the stop when the secondary pawl is in the third position, and when the armrest is in the closed position and not subjected to dynamic external forces, the travel rod is disposed at the first end of the arcuate slot, and the primary pawl is in the first position, and when the armrest is in the open position and not subjected to dynamic external forces, the travel rod is disposed at the second end of the arcuate slot opposite from the first end, the primary pawl is in the first position, and the secondary pawl is in the third position, and the secondary pawl is in contact with the stop in the third position, and wherein when the armrest is in the closed position and subjected to dynamic external forces, the armrest engages a locked position in which the primary pawl moves from the first position to the second position, the travel rod moves away from the first end of the arcuate slot, and the secondary pawl moves from the third position to the fourth position, wherein the travel rod contacts and interferes with movement of the primary pawl, the secondary pawl contacts and interferes with movement of the primary pawl and the travel rod, and the travel rod is held within the first portion.

* * * * *